(12) United States Patent
Eppensteiner et al.

(10) Patent No.: US 11,525,858 B2
(45) Date of Patent: Dec. 13, 2022

(54) METHOD AND SYSTEM FOR PREDICTIVE MAINTENANCE OF INTEGRATED CIRCUITS

(71) Applicant: Siemens Aktiengesellschaft, Munich (DE)

(72) Inventors: Friedrich Eppensteiner, Spitz (AT); Majid Ghameshlu, Vienna (AT); Martin Matschnig, Tulln (AT); Bernhard Fischer, Vienna (AT); Thomas Hinterstoisser, Bisamberg (AT); Herbert Taucher, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 344 days.

(21) Appl. No.: 16/632,083

(22) PCT Filed: Jul. 18, 2018

(86) PCT No.: PCT/EP2018/069530
§ 371 (c)(1),
(2) Date: Jan. 17, 2020

(87) PCT Pub. No.: WO2019/016278
PCT Pub. Date: Jan. 24, 2019

(65) Prior Publication Data
US 2020/0166568 A1    May 28, 2020

(30) Foreign Application Priority Data

Jul. 19, 2017 (EP) ..................................... 17182034

(51) Int. Cl.
*G01R 31/28* (2006.01)
*G01K 13/00* (2021.01)

(52) U.S. Cl.
CPC ......... *G01R 31/2882* (2013.01); *G01K 13/00* (2013.01); *G01R 31/2856* (2013.01); *G01K 2217/00* (2013.01)

(58) Field of Classification Search
CPC ..... G01K 13/00; G06F 2119/04; G06F 11/00; G01R 31/31725
See application file for complete search history.

(56) References Cited

U.S. PATENT DOCUMENTS 9,587,992 B1 * 3/2017 Cirit .......................... G01K 7/01
2006/0164116 A1   7/2006 Haetty
(Continued)

FOREIGN PATENT DOCUMENTS

CN    1808131      7/2006
CN    101706551    5/2010
(Continued)

OTHER PUBLICATIONS

Office Action dated Jun. 24, 2021 issued in Chinese Patent Application No. 201880047799.6.
(Continued)

*Primary Examiner* — Akm Zakaria
(74) *Attorney, Agent, or Firm* — Cozen O'Connor

(57) ABSTRACT

A system and method for the predictive maintenance of electronic components that includes sensors at at least one position via which present values of system parameters, such as temperature and voltage, and a signal propagation time at the at least one position are determined, where values of the system parameters and the signal propagation time presently determined by the sensors are retrieved by a central monitoring unit, an individual valid limit value is determined for the signal propagation time at each of the at least one position via the central monitoring unit based on the presently determined values of the system parameters, (Continued)

and the presently determined signal propagation time at each of the at least one position is compared with the associated valid limit value, and a notification is sent to a superordinate level, if the signal propagation time exceeds the limit value to trigger replacement of the electronic component.

18 Claims, 2 Drawing Sheets

(56) References Cited

U.S. PATENT DOCUMENTS

| | | |
|---|---|---|
| 2009/0083598 A1 | 3/2009 | Dixit et al. |
| 2011/0128055 A1 | 6/2011 | Pelgrom et al. |
| 2011/0141643 A1 | 6/2011 | Hummel et al. |
| 2013/0013247 A1* | 1/2013 | Sato .................. G01R 31/2856 702/117 |
| 2013/0080090 A1 | 3/2013 | Potkonjak |
| 2013/0093488 A1 | 4/2013 | Ramaswami et al. |
| 2013/0222006 A1 | 8/2013 | Weiss |
| 2016/0349316 A1* | 12/2016 | Miro Panades .......... H03K 5/13 |

FOREIGN PATENT DOCUMENTS

| | | |
|---|---|---|
| CN | 101762781 | 6/2010 |
| CN | 101981460 | 2/2011 |
| CN | 102124619 | 7/2011 |
| CN | 102812373 | 12/2012 |
| CN | 103119455 | 5/2013 |

OTHER PUBLICATIONS

Tschanz, J. et al. "Adaptive Frequency and Biasing Techniques for Tolerance to Dynamic Temperature-Voltage Variations and Aging", 2007 IEEE International Solid-State Circuits Conference, pp. 292, 293 and 604, Dec. 31, 2007.

Reddy, V. et al. "Impact of Negative Bias Temperature Instability on Digital Circuit Reliability", pp. 31-38, Dec. 31, 2005.

Mitra, S. et al. "Circuit Failure Prediction to Overcome Scaled CMOS Reliability Challenges", Lecture 4.2; International Test Conference, pp. 1-3, Dec. 31, 2007.

International PCT Search Report dated Oct. 8, 2018 based on PCT/EP2018/069530 filed Jul. 18, 2018.

* cited by examiner

METHOD AND SYSTEM FOR PREDICTIVE MAINTENANCE OF INTEGRATED CIRCUITS

CROSS-REFERENCE TO RELATED APPLICATIONS

This is a U.S. national stage of application No. PCT/EP17182034 filed Jul. 19, 2017. Priority is claimed on EP Application No. 17182034 filed Jul. 19, 2017, the content of which is incorporated herein by reference in its entirety.

BACKGROUND OF THE INVENTION

1. Field of the Invention

The present invention relates in general to the field of electronic systems and circuits, particularly integrated circuits, such as application-specific integrated circuits (ASICs) and field-programmable gate arrays (FPGAs) and, more specifically to a method for predictive maintenance of an electronic device which is implemented as an integrated circuit, in particular as an ASIC or FPGA, and relates to an associated system for predictive maintenance of the electronic device, where in at least one position, the electronic device has sensors by which system parameters and a signal propagation time are determined at the at least one position during operation of the electronic device.

2. Description of the Related Art

In many complex systems, such as open- and closed-loop control systems for plant and machinery, computer systems, production facilities, vehicles and aircraft or propulsion units, reliability of the overall system is a key factor particularly in the case of safety-critical applications. The reliability of the overall system can be significantly affected in particular by the service life of individual system components or assemblies or more specifically the underlying electronic devices, where the term "service life" of a system component or electronic device usually denotes a time period in which it can be used without replacement or total failure.

In order to increase the system reliability or rather functional safety of a system, critical system components or assemblies are usually of redundant design. That is, a functionally identical or comparable component is present in addition to the respective system component and, in the event of failure of the respective system component, can assume the tasks or function thereof. Although the overall system will still be operational in this case, another fault, such a malfunction or failure of the redundant component, would mean immediate system failure or malfunction of the overall system. Therefore, in most cases an overall system is promptly placed in a safe state, for example, if a system component fails or rather the associated redundant component is used, usually until the failed system component has been replaced. This often results in reduced operational capability of the overall system or causes downtimes that usually have additional cost implications.

In order to reduce downtimes and associated additional costs, "look-ahead" or "predictive maintenance" is used, for example, in manufacturing industry, in production plants, and for vehicle and/or aircraft maintenance. The operation and functional efficiency of the respective overall system or of individual system components (e.g., machinery, engines, or aircraft propulsion system) are analyzed based on data and information that is determined during operation via sensors and/or recordings of events ("logs"), and predictions concerning possible error states and/or failures of the respective system component or of the overall system are deduced therefrom. If necessary, appropriate alarms can then be triggered and countermeasures can be taken in good time, i.e., prior to failure of the respective system component or of the overall system, e.g., timely maintenance and/or timely replacement of the component in question. Predictive maintenance methods have already been used for some time, for example, in the field of aerospace engineering, such as to optimize propulsion unit maintenance or rather the logistics required for that purpose. For example, information is derived from a large amount of available sensor data from the propulsion unit as a way of supporting and optimizing maintenance.

Nowadays, "embedded systems" are used for many applications, particularly also for safety-critical applications, in overall systems (e.g., in medical equipment, consumer electronics, or in the home, and/or in factories, in vehicles, or in aircraft). An embedded system is an electronic system component (e.g., processor or computer) that is integrated within a technical context, where it assumes, e.g., monitoring, open-loop and/or closed-loop control functions or is responsible, e.g., for signal processing. Embedded systems are often specifically adapted to the respective task and frequently have to meet real-time requirements.

In embedded systems, a central role is played by electronic devices that are implemented as integrated circuits, in particular application-specific integrated circuits (ASICs) and/or field-programmable gate arrays (FPGAs). In many cases or almost inevitably, malfunction or failure of an integrated circuit results in a malfunction and consequently failure of the overall system and therefore causes at least downtimes. In order to tackle the downtimes or rather guard against such failures and associated costs, critical components in particular, which are frequently implemented as integrated circuits such as ASICs or FPGAs, are replaced at somewhat pessimistically selected, i.e., quite short, maintenance intervals. These maintenance intervals are very often determined by the electronic devices implemented as integrated circuits, these being particularly prone to malfunctions and/or error states or failures due to aging.

Integrated circuits are usually electronic circuits which are mounted on a thin chip or die, mostly a few millimeters thick, of semiconductor material (e.g., silicon) and encapsulated in a chip package for protection and to facilitate contact-making. The integrated circuit typically consists of a combination of numerous electrically connected electronic semiconductor devices (e.g., transistors, diodes and/or other active and/or passive devices). Over time, physical and chemical effects, for example, cause the semiconductor material to deteriorate, thus giving rise to negative effects in respect of the functionality especially of the transistors of the integrated circuit. In particular, signal propagation times in the integrated circuit become slower, thereby adversely affecting the operation thereof. That is, with increasing age or rather with the duration of use of an integrated circuit, signal transmission is subject to delay, the speed of the integrated circuit decreases, resulting in malfunctions and error states leading to failure of the chip. The integrated circuit has therefore reached the end of its service life and must be replaced.

The service life of the respective electronic device or of the integrated circuit (ASIC, FPGA) can therefore be used to determine maintenance intervals for systems having integrated circuits. In order to determine this, it is necessary to rely, for example, on specifications of the respective manufacturer of the integrated circuit. The manufacturer will guarantee a maximum failure rate subject to certain conditions (e.g., temperature range for operation, or max. voltage). A service life and consequently a maintenance interval for the overall system can then be derived from the totality of the manufacturer specifications for the respective individual electronic devices or integrated circuits of the overall system.

A disadvantage of this procedure, however, is that the manufacturer data, such as the maximum failure rate, for an integrated circuit is usually based on average or mean values of, e.g., reliability tests and/or stress tests at, e.g., elevated temperature and/or voltage. No concrete assumptions can therefore be made with respect to the integrated circuits used during operation in the overall system. For example, because of its use or area of application during operation, an integrated circuit can exhibit slower or more rapid aging and therefore have a greater or lesser degree of reliability, i.e., a longer or shorter service life than that specified. On the one hand, particularly in the case of critical components, this can result, for example, in relatively short maintenance intervals and/or possibly unnecessary or premature replacement of the electronic device and therefore additional costs. On the other hand, error states and/or failures of components/electronic devices may still occur in spite of short maintenance intervals having been selected, resulting in downtimes and costs. It would therefore be helpful also for systems that have electronic devices, such as ASICs and/or FPGAs, implemented as integrated circuits to use look-ahead or predictive maintenance in order to detect abnormal behavior/malfunctions, error states and failures of electronic devices, in particular due to aging, in a timely manner.

The publication S. Mitra and M. Agarwal; "Circuit failure prediction to overcome scaled CMOS reliability challenges"; 2007 IEEE International Test Conference, p. 1-3, 2007, for example, discloses a method for predicting failures of integrated circuits, in particular based CMOS technology. Here, a large number of different sensors are mounted at various positions in the semiconductor material, i.e., in the chip, of an integrated circuit. Information about various system parameters, such as temperature, voltage, ring oscillator delay, or complex time relationships of logic signals, are collected by these sensors. The information collected by the sensors can then be evaluated on-chip or off-chip to identify anomalies and therefore predict any malfunctions occurring. However, because of the large amount of information, this method requires relative and possibly time- and cost-intensive evaluation.

SUMMARY OF THE INVENTION

In view of the foregoing, it is therefore an object of the invention to provide a method for predictive maintenance of electronic devices or more specifically of integrated circuits, and an associated system for implementing the method whereby in particular aging-related malfunctions and/or error states of electronic devices or more specifically integrated circuits can be detected at an early stage in a simple and rapid manner and with minimal cost/complexity.

This and other objects and advantages are achieved in accordance with the invention by a method and an associated system for implementing the method in accordance with the invention, where a central monitoring unit is installed in an electronic device. This central monitoring unit interrogates the system parameter values, such as voltage and temperature, currently detected by the sensors in the electronic device at the at least one position and the signal propagation time currently detected at the at least one position. Based on the currently detected system parameter values, an applicable limit value for the signal propagation time at the at least one position is determined by the central monitoring unit. The applicable limit value for the signal propagation time is compared with the currently detected value of the signal propagation time at the at least one position. If the applicable limit value for the signal propagation time is exceeded by the currently detected value of the signal propagation time at the at least one position, an indication is sent to a superordinate level by the central monitoring unit.

The main aspect of the method in accordance with the invention is that it provides a quick, simple and relatively inexpensive means of early detection that a malfunction and/or an error state will occur in the near future in an electronic device. The method in accordance with the invention not only provides cost savings, but also enables maintenance intervals to be organized better and/or in a dynamic and requirement-oriented manner and downtimes to be reduced or in some cases avoided. In particular, based on the applicable limit value determined for the signal propagation time, any significant slowing of the signal propagation time can be identified very simply and quickly by the central monitoring unit. Malfunctions and error states that would occur due to aging in the near future in electronic devices or more specifically integrated circuits are therefore detected in good time and can be reported to a superordinate level. Such a superordinate level can be, for example, an overall system in which the electronic device is incorporated, or a central control unit (e.g., for a plurality of overall systems). With the appropriate indication to the superordinate level, for example, maintenance of an overall system or more specifically replacement of the relevant system component in which the electronic device or more specifically the integrated circuit is being used, or of the electronic device itself, can be initiated without, e.g., incurring additional downtimes.

With the aid of the central monitoring unit by which system parameter values and signal propagation time values from sensors at various positions in the electronic device are interrogated, data and information from different parts of the electronic device or more specifically of the integrated circuit can be evaluated. With this collective evaluation of information and data which has been acquired at different positions in the electronic device, effects can possibly be made visible that would remain undetected in the case of selective, i.e., purely position-specific evaluation.

It is advantageous if the sensors installed in the electronic device in at least one position are combined in a position-specific manner in at least one monitoring element. The sensors at a position in the electronic device or rather the system parameter values and signal propagation time values provided by the sensors at this position are consolidated by the monitoring element, thereby simplifying the forwarding thereof to the central monitoring unit. Particularly in the case of larger and complex integrated circuits that may have sensors for detecting system parameters and the propagation time at a large number of positions, the interrogation of the current values of the system parameters and signal propagation time for the respective position can be considerably simplified for the central monitoring unit by the sensors being combined into monitoring elements at the respective positions in the electronic device. In addition, the respective position from which these values originate can be identified or determined much more simply by the central monitoring unit.

It is also advantageous if determination of the applicable limit value for the signal propagation time at the at least one position based on the currently detected values of the system parameters at this at least one position is performed such that a critical value for the signal propagation time at the at least one position is not exceeded by the applicable limit value determined. The determined applicable limit value is ideally a predefined tolerance or a predefinable guard interval below the critical value for the signal propagation time. The critical value for the signal propagation time is dependent on the respective application, i.e., the respective use of the electronic device. For the respective application, the critical value specifies a signal propagation time below which malfunctions, error states and/or failures will occur due to age-related signal delays and at which the electronic device must be replaced. As the applicable limit value determined for the signal propagation time is still below the critical value, the electronic device, i.e., the integrated circuit, for example, can be replaced in good time, i.e. before age-related malfunctions and/or error states occur in the electronic integrated device.

In an advantageous embodiment of the method in accordance with the invention, the system parameters values and signal propagation time values currently detected by the sensors at the at least one position are continuously interrogated by the central monitoring unit during operation of the electronic device or of the superordinate overall system. Thus, for example, the slowing of signal propagation times can be immediately identified and prompt action taken accordingly. Continuous data interrogation and evaluation by the central monitoring unit is useful particularly in the case of safety-relevant applications and/or fields of activity of the electronic device where there are high levels of temperature and/or voltage stress, for example, which may result in more rapid aging of the chip.

Alternatively, the system parameter values and signal propagation time values detected by the sensors at the at least one position can be advantageously interrogated and evaluated by the central monitoring unit during predefined, periodic self-test phases during operation. Thus, for example, the data evaluation workload in the central monitoring unit can be reduced in the case of electronic devices having a relatively long service life or when using electronic devices in which the chip is subject to lower temperature and/or voltage stress, for example.

For determining the system parameters, in particular for determining temperature and voltage, and also the signal propagation time, it is also advantageous if sensors already present at the at least one position are used that are employed to minimize power dissipation of the electronic device. In the case of integrated circuits, in particular in the case of application-specific integrated circuits (ASICs), voltage, temperature and process are nowadays already often detected using "Vernier delay lines" and signal delay is deduced therefrom. Using this information, regulation of the supply voltage or so-called dynamic voltage scaling (DVS), i.e., dynamic voltage adjustment to minimize dissipation, is performed. A supply voltage for the integrated circuit is regulated such that a signal delay does not exceed a defined value at which all the delays in the chip are still maintained. To acquire the information for dynamic voltage scaling or DVS, appropriate sensors for measuring temperature, voltage and signal propagation time are usually installed at a plurality of positions in the semiconductor material of the electronic device or more specifically the integrated circuit. At least some of these sensors already present can ideally be used to detect the current values of the system parameters, in particular temperature and voltage, as well as the signal propagation time.

It is also advantageous if temperature and voltage at the at least one position of the electronic device are determined as system parameters in addition to the signal propagation time. The currently determined values of temperature and voltage of the respective position are used by the central monitoring unit as input values for determining the applicable limit value for the signal propagation time of the respective position. This provides a relatively simple means of inferring the aging of the electronic device during data interrogation and evaluation by the central monitoring unit. Only current values of temperature and voltage at a position of the electronic device and the signal propagation time at this position are used as parameters for this purpose.

It is also an object of the invention to provide a system for implementing the method in accordance with the invention for predictive maintenance of electronic devices or more specifically integrated circuits, in particular of ASICs or FPGAs. The system in accordance with the invention comprises at least sensors for determining current values of system parameters and a signal propagation time at at least one position of the electronic device. The sensors are mounted in the electronic device, e.g., in the semiconductor material of the electronic device. The system also comprises a central monitoring unit that is likewise mounted in the electronic device. This central monitoring unit is configured to interrogate the system parameter values and signal propagation time values determined at the at least one position of the electronic device, to determine an applicable limit value for the signal propagation time at the at least one position based on the currently determined system parameter values and to compare the applicable limit value with the currently determined value of the signal propagation time at the at least one position.

Ideally, the central monitoring unit is also configured to send indications to a superordinate level if the applicable limit value is exceeded by the currently determined value of the signal propagation time at the at least one position.

The system in accordance with the invention detects malfunctions and/or error states occurring in the immediate future in an electronic device or more specifically in an integrated circuit with relatively little cost/complexity and in good time. In particular, via the applicable limit value determined for the signal propagation time, any significant slowing of the signal propagation time can be identified very simply and quickly by the central monitoring unit. Age-related error states or failures of electronic devices likely in the immediate future are therefore detected in good time and can be reported by the central monitoring unit to a superordinate level, such as the overall system in which the electronic device is installed, for example, or to a central control unit (e.g., for a plurality of overall systems). This not only saves costs but also enables devices and/or system components to be replaced in good time, downtimes to be reduced or possibly prevented and maintenance intervals to be designed dynamically and on a just-in-time basis.

Due to the use, in the system in accordance with the invention, of a central monitoring unit by which system parameters and signal propagation time values from sensors at different positions of the electronic device are interrogated, data and information from different parts of the electronic device can be collectively evaluated. This may enable effects to be made visible that would remain undetected in the case of selective or rather purely position-specific evaluation.

In a preferred further embodiment of the system in accordance with the invention, at least one monitoring element is provided in which the sensors mounted in the electronic device at the at least one position are combined. The sensors are combined at the at least one position of the electronic device by the at least one monitoring element and the system parameter values and signal propagation time values acquired by the sensors are consolidated. Particularly in the case of sensors at a plurality of positions of the electronic device, a position-specific combination of the sensors at the respective positions to form monitoring elements can result in significant simplification of data interrogation by the central monitoring unit. In addition, the respective position from which the data or more specifically the current system parameter values and signal propagation time values originate can be determined much more simply by the central monitoring unit.

Ideally, at least one sensor for determining current temperature values and one sensor for determining current voltage values are used as sensors for acquiring current values of system parameters at the at least one position of the electronic device. Thus, for example, if present in the electronic device or more specifically the integrated circuit, then an infrastructure of dynamic voltage scaling (DVS) can be used at least to some extent to minimize the power dissipated. In particular, this considerably simplifies the development and implementation of an electronic device incorporating the predictive maintenance system in accordance with the invention.

In a special the system in accordance with the invention, the central monitoring unit is formed as a discrete unit of the electronic device. That is, the central monitoring unit is implemented as a standalone module in the electronic device or more specifically integrated circuit. The central monitoring unit can therefore perform the interrogation and evaluation of the system parameter and signal propagation time values largely independently of the other units (e.g., CPU, or controller etc.) of the electronic device.

Alternatively, the central monitoring unit can be incorporated in a system unit, such as a CPU or processor unit, of the electronic device. The interrogation and evaluation of the system parameters and signal propagation time from the sensors, i.e. the monitoring elements, is then processed by the system unit. The central monitoring unit thus constitutes a functional entity of the system unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be explained with reference to examples and the associated drawings, in which.

DETAILED DESCRIPTION OF THE EXEMPLARY EMBODIMENTS

Figure 1:
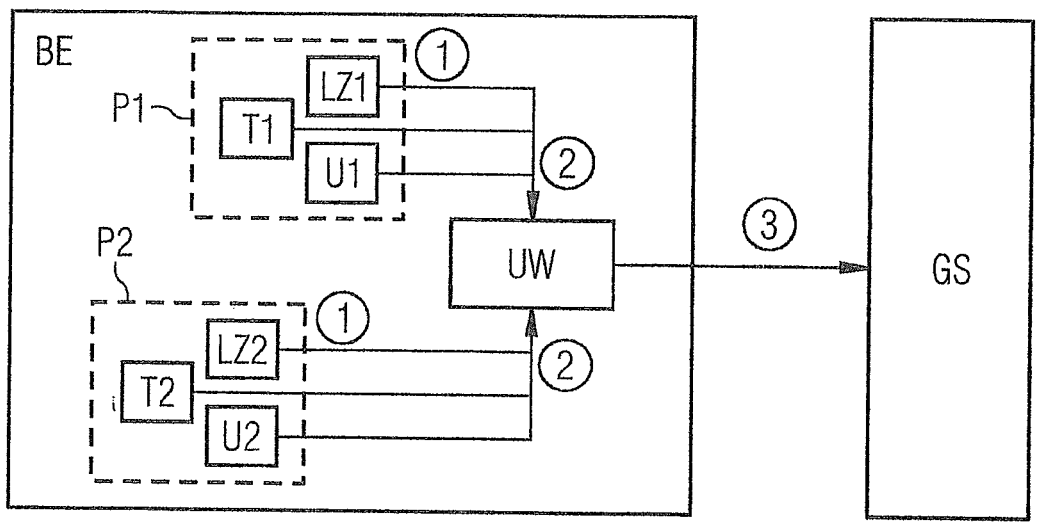
FIG. 1 schematically illustrates a typical sequence of the inventive method for the predictive maintenance of an electronic device incorporating the associated system in accordance with the invention.

FIG. 1 schematically illustrates a typical electronic device BE. The device BE is implemented as an integrated circuit, e.g., as an application-specific integrated circuit or ASIC. Alternatively, however, the electronic device BE can also be implemented as a field-programmable gate array (FPGA). The electronic device BE can be, for example, a system component or part of a system component in an overall system GS that operates as a superordinate level and is formed, for example, as an embedded system GS.

In addition to other units not shown in FIG. 1 for simplicity's sake, the electronic device BE shown by way of example in FIG. 1 has, at two typical positions P1, P2, a plurality of sensors T1, U1, LZ1, T2, U2, LZ2 which are mounted, e.g., in the semiconductor material of the electronic device BE or more specifically the integrated circuit. At the respective position P1, P2, current system parameter values, e.g., temperature and voltage, as well as a signal propagation time are determined by the sensors T1, U1, LZ1, T2, U2, LZ2. That is, with respect to first sensors T1, U1, LZ1, for example, at a first position P1, current temperature values of the electronic device BE are determined by a sensor T1, current voltage values are determined by a sensor U1 and current values for the signal propagation time are determined by sensor LZ1. At a second position P2 of the electronic device BE, current values of temperature, voltage and signal propagation time for the second position P2 are likewise determined, e.g., by second sensors T2, U2, LZ2. For this purpose, the second sensors T2, U2, LZ2 likewise have a sensor T2 for determining current temperature values, a sensor U2 for determining current voltage values and a sensor LZ2 with which current values of the signal propagation time at the second position P2 can be determined. The sensors T1, U1, LZ1, T2, U2, LZ2 can be, e.g., at least part of an already available dynamic voltage scaling (DVS) infrastructure for minimizing power dissipation.

The electronic device BE also has a central monitoring unit UW which, in conjunction with the sensors T1, U1, LZ1, T2, U2, LZ2 mounted in the electronic device BE, forms the system in accordance with the invention for predictive maintenance of the electronic device BE. The central monitoring unit UW can be implemented as a discrete unit or more specifically a discrete module in the electronic device BE. Alternatively, the central monitoring unit UW can be incorporated in a system unit (not shown in FIG. 1) of the electronic device BE, such as a CPU, or a processor, and be implemented thereby as a functional unit in the overall system GS.

The central monitoring unit UW is configured to perform the predictive maintenance method in accordance with the invention. Thus, in a first method step 1 the current values of the system parameters, in particular of temperature and voltage, and current values of a signal propagation time are determined at the respective position P1, P2 by the sensors T1, U1, LZ1, T2, U2, LZ2 during operation of the electronic device BE or rather of the overall system GS. The current values of the system parameters and the signal propagation time of the respective position P1, P2 are interrogated by the central monitoring unit UW.

Interrogation of the current system parameter values and signal propagation time values of the different positions P1, P2 by the central monitoring unit UW can be performed, e.g., continuously during operation of the electronic device BE. Alternatively, the current system parameter values and signal propagation time values determined by the sensors T1, U1, LZ1, T2, U2, LZ2 at the respective positions P1, P2 can also be interrogated during predefined self-test phases, said self-test phases being repeated, i.e., run through, periodically.

In a second method step 2, an applicable limit value for the signal propagation time at the respective position P1, P2 is determined by the central monitoring unit UW based on the current system parameter values determined at the respective position P1, P2, in particular based on the current temperature and voltage values. The determination of the determined applicable limit value for the signal propagation time at the respective position P1, P2 is performed such that a respective critical value for the signal propagation time at the respective position P1, P2 is not exceeded by the applicable limit value determined. That is, the applicable limit value is an, e.g., predefinable tolerance or guard interval below the respective critical value for the signal propagation time at the respective position P1, P2 where, if the critical value for the signal propagation time at a position P1, P2 of the electronic device BE is reached, then the electronic device BE should or must be replaced, e.g., because of error states occurring.

In the case of the electronic device BE shown by way of example in FIG. 1, in the second method step 2 a first applicable limit value for the signal propagation time at the first position P1 is determined by the central monitoring unit UW, e.g., based on the current values of temperature and voltage determined by the first sensors T1, U1. In addition, a second applicable limit value for the signal propagation time at the second position P2 is determined by the central monitoring unit UW for the second position P2 based on the second sensors T2, U2.

The applicable limit value for the signal propagation time at the respective position P1, P2 is then compared by the central monitoring unit UW with the currently determined value of the signal propagation time at the respective position P1, P2. In the course of aging of the electronic device BE, the signal propagation time at different positions P1, P2 in the electronic device may become slower even if general conditions (e.g., temperature, voltage, or load) remain the same. The central monitoring unit UW enables any significant slowing of the signal propagation time at the respective position P1, P2 of the electronic device BE to be detected. This means, in the case of the electronic device BE shown by way of example in FIG. 1, that, e.g., the first applicable limit value is compared by the central monitoring unit with currently determined values of the signal propagation time that have been determined by the sensor LZ1 at the first position P1. The second applicable limit value is then compared, e.g., with currently determined values of the signal propagation time that have been determined by the sensor LZ2 at the second position P2.

If the comparison of the respective current value of the signal propagation time at the respective position P1, P2 with the corresponding applicable limit value reveals that the corresponding applicable limit value is exceeded by a currently determined signal propagation time value at at least one position P1, P2, then in a third method step 3, an indication is sent by the central monitoring unit UW to the superordinate level, e.g., to the overall system GS. Alternatively, e.g., the indication can be sent by the central monitoring unit UW to a central control unit by which, for example, the overall system GS or a plurality of systems are monitored. As a result of the indication, there can be a suitable reaction at the superordinate system level GS, e.g., via alarm signals, by taking appropriate action, etc. For example, the electronic device BE or the corresponding system component can be replaced or maintenance of the overall system GS can be initiated on a just-in-time basis.

Figure 2:
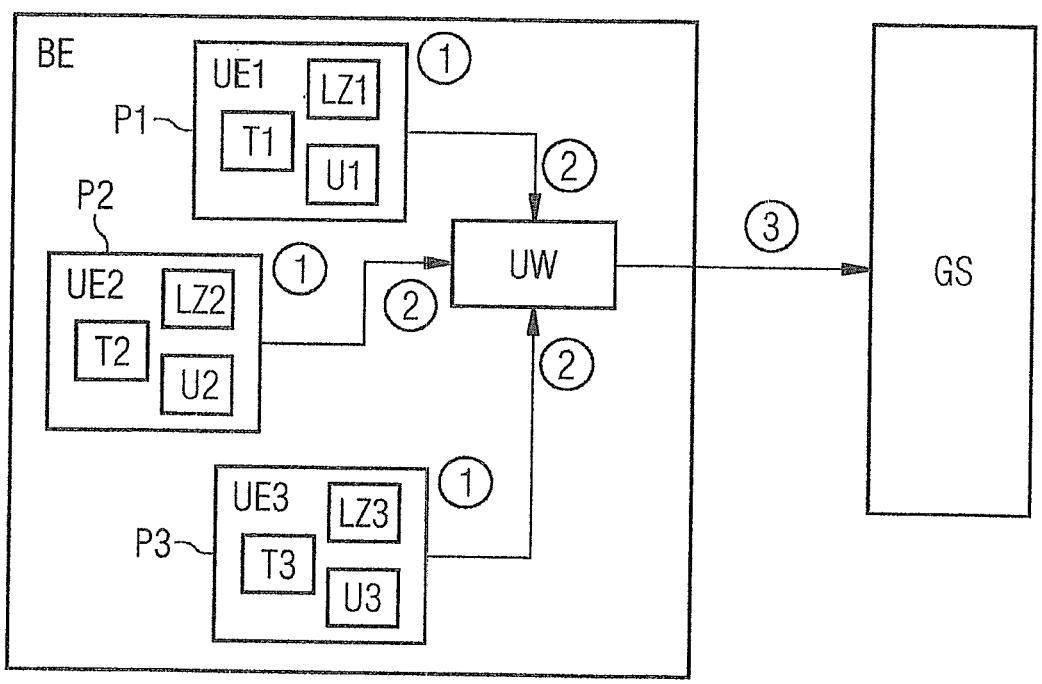
FIG. 2 schematically illustrates an embodiment of a system for predictive maintenance of an electronic device in accordance with the invention.

FIG. 2 again schematically illustrates the typical electronic device BE incorporating the system for predictive maintenance. For this purpose, there are mounted in the electronic device BE or more specifically in the semiconductor material of the electronic device BE, for example, at a plurality of (e.g. three) positions P1, P2, P3 sensors T1, U1, LZ1, T2, U2, LZ2, T3, U3, LZ3 by which current values of the system parameters (e.g., temperature, voltage) and the signal propagation time at the respective position P1, P2, P3 are determined. To simplify the system or more specifically interrogation by the central monitoring unit UW of the values currently determined by the respective sensors T1, U1, LZ1, T2, U2, LZ2, T3, U3, LZ3, the sensors T1, U1, LZ1, T2, U2, LZ2, T3, U3, LZ3 are combined in a position-specific manner in monitoring elements UE1, UE2, UE3. A monitoring element UE1 thus comprises, e.g., first sensors T1, U1, LZ1 for determining the current values of the system parameters or more specifically of temperature and voltage, and the signal propagation time at the first position P1. Second sensors T2, U2, LZ2 of the second position P2 are combined, e.g., in a second monitoring element UE2 and a third monitoring element UE3 comprises, for example, third sensors T3, U3, LZ3 at a third position P3.

The current system parameter values and signal propagation time values at the respective position P1, P2, P3 are again determined during operation by the respective sensors T1, U1, LZ1, T2, U2, LZ2, T3, U3, LZ3 in the first method step 1. The currently determined system parameter values and signal propagation time values at the respective position P1, P2, P3 are then consolidated by the respective monitoring element UE1, UE2, UE3 and can be requested from the respective monitoring element UE1, UE2, UE3 in a position-specific manner by the central monitoring unit UW either continuously or during predefinable, periodic self-test phases of the electronic device BE.

In the second method step 2, based on the currently determined values of the system parameters for the respective position P1, P2, P3, an applicable limit value for the signal propagation time at the respective position P1, P2, P3 is determined by the central monitoring unit UW. The applicable limit value for the signal propagation time at the respective position P1, P2, P3 is then compared with signal propagation time values currently determined for the respective position P1, P2, P3. If at least one of the applicable limit values for the signal propagation time at the respective position P1, P2, P3 is exceeded by the corresponding currently determined value of the signal propagation time for the respective position P1, P2, P3, in a third method step 3, an indication is sent to the superordinate level, e.g., the overall system GS. Appropriate action and responses can then again be initiated.

In an alternative embodiment of the system in accordance with the invention, e.g., the second method step 2 of the method in accordance with the invention can be transferred at least partly to the monitoring elements UE1, UE2, UE3. This means that the system parameter values and signal propagation time values determined by the respective sensors T1, U1, LZ1, T2, U2, LZ2, T3, U3, LZ3 can already be evaluated locally in the respective monitoring element UE1, UE2, UE3. In the first monitoring element UE1, for example, the applicable limit value for the signal propagation time at the first position P1 is determined based on the currently determined system parameter values, in particular temperature and voltage, and the comparison of the applicable limit value with the currently determined value of the signal propagation time at the first position P1 is then performed. Similarly, this part of the second method step 2 is also performed by the other monitoring elements UE2, UE3 for the respective other positions P2, P3.

The monitoring elements UE1, UE2, UE3 can then be interrogated by the central monitoring unit UW, for example, and the respective comparison result (e.g., "limit value exceeded", "limit value not exceeded") can be forwarded to the central monitoring unit UW. If the central monitoring unit ascertains that a response from at least one monitoring element UE1, UE2, UE3 reads "limit value exceeded", then in the third method step 3, an indication can be sent by the central monitoring unit UW to the superordinate level.

Figure 3:
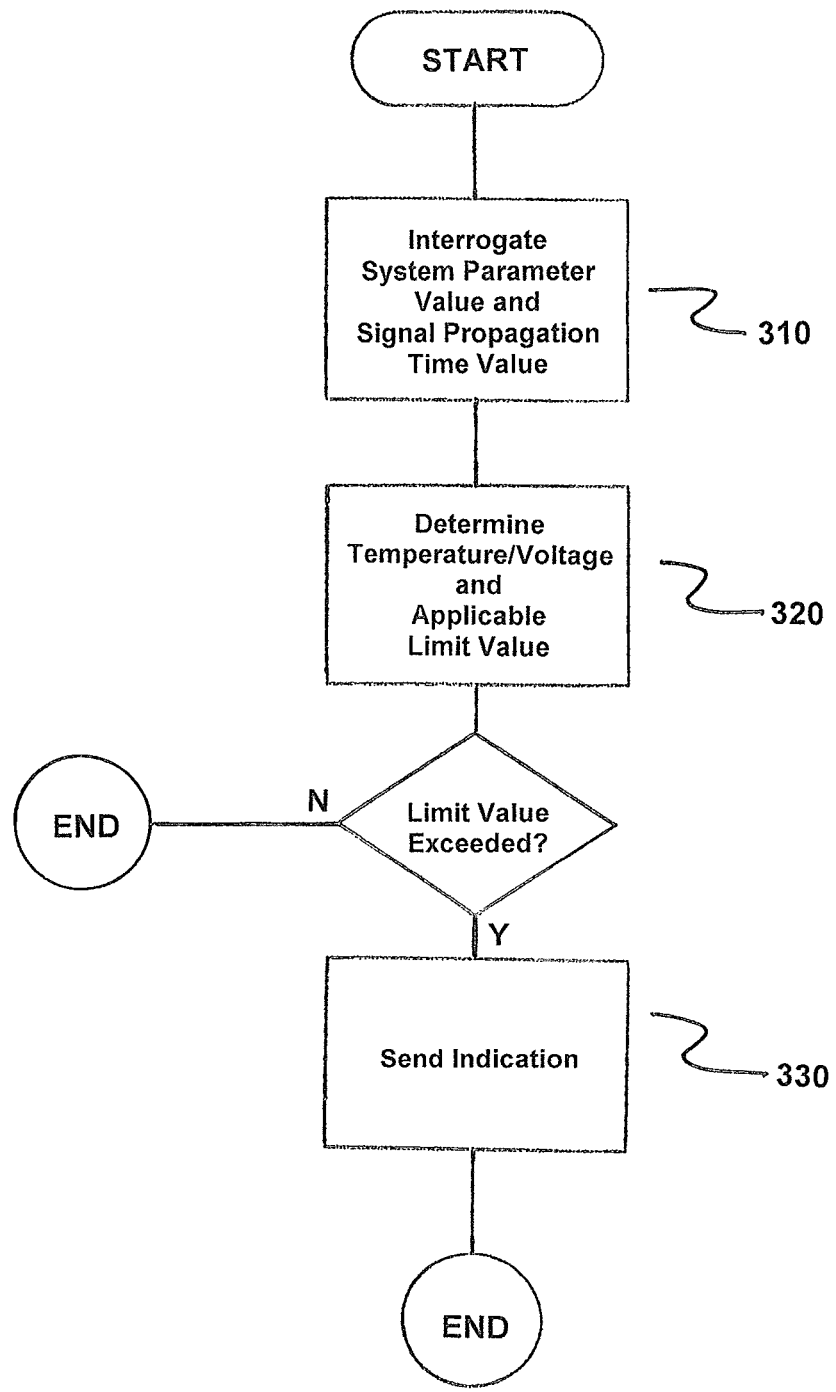
FIG. 3 is a flowchart of the method in accordance with the invention.

FIG. 3 is a flowchart of a method for predictive maintenance of an electronic device BE which is implemented as an integrated circuit, where the electronic device BE has, at at least one position P1, P2, sensors T1, U1, LZ1, T2, U2, LZ2 via which current values of system parameters and of a signal propagation time at the at least one position P1, P2 are determined during operation. The method comprises interrogating, by a central monitoring unit UW mounted in the electronic device BE, the system parameter values and signal propagation time values currently detected by the sensors T1, U1, LZ1, T2, U2, LZ2 at the at least one position P1, P2, as indicated in step 310.

Next, the temperature and voltage at the at least one position P1, P2 of the electronic device BE are determined as system parameters and determining an applicable limit value for the signal propagation time at the at least one position P1, P2 is determined based on the currently determined system parameter values, as indicated in step 320.

Next, an indication is sent to a superordinate level GS, if an applicable limit value is exceeded by the currently detected value of the signal propagation time at the at least one position P1, P2, as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for predictive maintenance of an electronic device which is implemented as an integrated circuit, the electronic device having, at at least one position, a plurality of sensors via which present values of system parameters and of signal propagation time values at the at least one position are determined during operation, the method comprising:

interrogating, by a central monitor mounted in the electronic device, the system parameter values and the signal propagation time values presently detected by each sensor of the plurality of sensors at the at least one position;

determining, by the central monitor, temperature and voltage at the at least one position of the electronic device as the system parameters and determining, by the central monitor, an applicable limit value for the signal propagation time at the at least one position based on the presently determined system parameter values;

sending an indication to a superordinate level, if an applicable limit value is exceeded by the presently detected value of the signal propagation time at the at least one position;

wherein the plurality of sensors minimize power dissipation and determine the system parameters and the signal propagation time values at the at least one position.

2. The method as claimed in claim 1, wherein the plurality of sensors mounted in the electronic device at the at least one position are combined in at least one monitoring element.

3. The method as claimed in claim 1, wherein determination of the applicable limit value for the signal propagation time at the at least one position is performed such that the applicable limit value is below a critical value for the signal propagation time at the at least one position.

4. The method as claimed in claim 2, wherein determination of the applicable limit value for the signal propagation time at the at least one position is performed such that the applicable limit value is below a critical value for the signal propagation time at the at least one position.

5. The method as claimed in claim 1, wherein during operation the system parameter values and signal propagation time values currently determined by the sensors at the at least one position are interrogated by the central monitor continuously or during predefined periodic self-test phases.

6. The method as claimed in claim 2, wherein during operation the system parameter values and signal propagation time values presently determined by the sensors at the at least one position are interrogated by the central monitor continuously or during predefined periodic self-test phases.

7. The method as claimed in claim 3, wherein during operation the system parameter values and signal propagation time values presently determined by the plurality of sensors at the at least one position are interrogated by the central monitor continuously or during predefined periodic self-test phases.

8. The method as claimed in claim 1, wherein the integrated circuit comprises one of an application-specific integrated circuit (ASIC) and a field programmable gate array (FPGA).

9. A system for performing predictive maintenance of an electronic device implemented as an integrated circuit, the system comprising:

a plurality of sensors, each sensor of the plurality of sensors determining present values of system parameters and signal propagation time values at at least one position of the electronic device;

a central monitor which interrogates the system parameter values and the signal propagation time values presently determined by the plurality of sensors at the at least one position of the electronic device, temperature and voltage at the at least one position of the electronic device being determined as the system parameters, which determines an applicable limit value for the signal propagation time at the at least one position based on the currently determined system parameter values, and which compares the applicable limit value with the presently determined value of the signal propagation time at the at least one position;

wherein the plurality of sensors minimize power dissipation and determine the system parameters and the signal propagation time values at the at least one position.

10. The system as claimed in claim 9, wherein the central monitor is further configured to send indications to a superordinate level if the applicable limit value is exceeded by the presently determined value of the signal propagation time at the at least one position.

11. The system as claimed in claim 9, further comprising:
at least one monitoring element in which the plurality of sensors mounted in the electronic device at the at least one position are combined.

12. The system as claimed in claim 10, further comprising:
at least one monitoring element in which the plurality of sensors mounted in the electronic device at the at least one position are combined.

13. The system as claimed in claim 9, wherein at least one sensor for determining current temperature values and one sensor for determining current voltage values of the plurality of sensors are utilized to determine present values of system parameters at the at least one position of the electronic device.

14. The system as claimed in claim 10, wherein at least one sensor for determining current temperature values and one sensor for determining current voltage values of the plurality of sensors are utilized to determine present values of system parameters at the at least one position of the electronic device.

15. The system as claimed in claim 11, wherein at least one sensor for determining current temperature values and one sensor for determining current voltage values of the plurality of sensors are utilized to determine present values of system parameters at the at least one position of the electronic device.

16. The system as claimed in claim 9, wherein the central monitor is implemented as a discrete unit.

17. The system as claimed in claim 9, wherein the central monitor is incorporated in a system unit.

18. The system as claimed in claim 9, wherein the integrated circuit comprises one of an application-specific integrated circuit (ASIC) and a field programmable gate array (FPGA).

* * * * *